US008201921B2

(12) United States Patent
Okada et al.

(10) Patent No.: US 8,201,921 B2
(45) Date of Patent: Jun. 19, 2012

(54) PRINTING APPARATUS

(75) Inventors: Yoshiyuki Okada, Inashiki-gun (JP); Masahiko Kusuhata, Inashiki-gun (JP); Teruaki Okawa, Inashiki-gun (JP)

(73) Assignee: Riso Kagaku Corporation, Minato-ku, Tokyo (JP)

(*) Notice: Subject to any disclaimer, the term of this patent is extended or adjusted under 35 U.S.C. 154(b) by 698 days.

(21) Appl. No.: 12/318,719

(22) Filed: Jan. 7, 2009

(65) Prior Publication Data

US 2009/0179924 A1 Jul. 16, 2009

(30) Foreign Application Priority Data

Jan. 11, 2008 (JP) ................................ P2008-004848

(51) Int. Cl.
*B41J 2/155* (2006.01)
*B41J 2/195* (2006.01)
*G01D 11/00* (2006.01)

(52) U.S. Cl. ................................ 347/42; 347/7; 347/100

(58) Field of Classification Search ................ 347/7, 14, 347/43, 101, 102, 42, 96, 6, 100
See application file for complete search history.

(56) References Cited

U.S. PATENT DOCUMENTS

| | | | | |
|---|---|---|---|---|
| 5,536,761 | A * | 7/1996 | Fujita | 523/160 |
| 6,318,853 | B1 * | 11/2001 | Asano et al. | 347/103 |
| 6,533,392 | B1 * | 3/2003 | Koitabashi | 347/43 |
| 2004/0150687 | A1 * | 8/2004 | Matsuyama | 347/16 |
| 2008/0165231 | A1 * | 7/2008 | Hiroki et al. | 347/86 |

FOREIGN PATENT DOCUMENTS

JP 11-165420 6/1999

* cited by examiner

*Primary Examiner* — Geoffrey Mruk
(74) *Attorney, Agent, or Firm* — The Nath Law Group; Jerald L. Meyer; Stanley N. Protigal

(57) ABSTRACT

A printing apparatus is capable of forming images by overlappingly performing print processes for a plurality of colors with non-aqueous inks and an aqueous ink. When printing with the aqueous ink, it is possible to inhibit paper from being deformed and to realize a high density print process with a low see-through density. At least one of the plurality of colors is printed with a non-aqueous ink containing a water-insoluble solvent, and the remaining colors is printed with an aqueous ink containing a water-soluble solvent. The print process of the non-aqueous ink is performed in advance of the print process of the aqueous ink.

10 Claims, 6 Drawing Sheets

PRINTING APPARATUS

BACKGROUND OF THE INVENTION

1. Field of the Invention

The present invention relates generally to a printing apparatus capable of forming images by overlappingly performing print processes for a plurality of colors, and more particular to a printing apparatus making use of an aqueous ink and a non-aqueous ink.

2. Description of the Background Art

Conventionally, there are known printing apparatuses capable of forming an image by overlappingly performing print processes of discharging inks of different colors from ink heads.

This type of printing apparatus is provided with cartridges in which standard and particular color inks are contained. The standard color inks (for example, Y: yellow, M: magenta; C: cyan) are aqueous or water-based inks containing a water-soluble solvent. The particular color ink (for example, K: black) is a non-aqueous or oil-based ink containing a water-insoluble solvent or an aqueous or water-based ink. For example, Japanese Patent Published Application No. Hei 11-165420 discloses an example of this technique.

However, in the case of the technique described in the above publication, an aqueous ink is used as a standard color ink, and a non-aqueous ink or aqueous ink is used as a particular color ink. Because of this, depending upon the print coverages of the respective color inks, the image on the printed side can be seen through from the backside (referred to as see-through phenomenon), and that paper becomes likely to be jammed in the paper path.

More specifically speaking, for example, in the case where black is printed with a non-aqueous ink, the pigment is hard to be fixed to the surface of the print sheet such that the density of black cannot be increased in a solid black area (which is filled in with black ink alone). If much ink is used to increase the density, the image on the printed side becomes seen through from the back side.

On the other hand, in the case where all the standard color inks are aqueous inks, when the print coverage of the standard color inks is high, a substantial amount of water contained in the ink tends to deform the print sheet and easily result in paper jam, and thereby there is a problem that it is difficult to increase the printing speed.

SUMMARY OF THE INVENTION

Taking into consideration the above circumstances, it is an object of the present invention to provide a printing apparatus capable of performing print processes with non-aqueous and aqueous inks, inhibiting paper from being deformed and realizing a high density print process with a low see-through density.

In order to accomplish the object as described above, the printing apparatus of the present invention is operable to form images by overlappingly performing print processes for a plurality of colors, wherein at least one of the plurality of colors is printed with a non-aqueous ink containing a water-insoluble solvent, and the remaining colors is printed with an aqueous ink containing a water-soluble solvent, and wherein the print process of the non-aqueous ink is performed in advance of the print process of the aqueous ink.

Meanwhile, in a preferred embodiment of the present invention, of the plurality of colors, black or the color having the highest density is printed with the aqueous ink. Alternatively, of the plurality of colors, a color which can be used to prepare a second color in combination with another color is printed with the aqueous ink.

In accordance with the present invention as described above, it is possible to inhibit paper from being deformed by performing the print process with the non-aqueous ink in advance of the print process with the aqueous ink. The inventors of the present invention discovered that paper was less deformed when printing a black (K) ink at a rate of 100% after printing CMY inks at a rate of 30%.

Particularly, in relation to the present invention, the inventors of the present invention discovered that it is possible to increase the solid black density and reduce the see-through density by making use of an aqueous ink for black (K), and to inhibit the deformation of the print sheet, on which an image having a high print coverage (filled in with solid black, red, blue, green or a second color) due to the effects of water contained in the aqueous ink by making use of a non-aqueous ink for CMY.

Also, in the case of the present invention, K and either one of C, M, and Y may be printed with an aqueous ink. Namely, since the print coverage increases when printing a second color such as B=CM, R=MY or G=MC, it is possible to limit the print coverage of the aqueous ink and prevent the amount of water contained in the aqueous ink from increasing by not making use of aqueous inks for two or more colors of C, M, and Y.

Several techniques can be considered for performing the print process with the non-aqueous ink in advance of the print process with the aqueous ink. For example, the ink heads for discharging the respective inks are arranged in order that the ink heads of non-aqueous inks are located in the upstream side of the ink head of the aqueous ink. Another example is to make use of circulation transportation as explained below.

That is, in a preferred embodiment of the present invention, the printing apparatus further comprises a circulation transportation unit configured to transport a print sheet to be printed in order that the print sheet is circulated and passed through an image forming unit, which discharges inks of the plurality of colors, for a plural number of times; and an image formation control unit configured to control the discharge timing of each of the inks, wherein the image formation control unit controls the discharge timing of each of the aqueous and non-aqueous inks in synchronization with the circulation transportation of the print sheet in order that the print process of the non-aqueous ink is performed in advance of the print process of the aqueous ink.

In this case, any desired color can be printed dynamically with the aqueous ink irrespective of the arrangement of the ink heads of the respective colors by adjusting the discharge timings of the aqueous ink and non-aqueous inks in synchronization with the circulation transportation of the print sheet.

In a preferred embodiment of the present invention, the printing apparatus further comprises: a coverage detecting unit configured to detect the print coverage of each of the plurality of colors; and an ink amount control unit configured to control the ink amount of each of the plurality of colors, wherein, when the print coverage of the aqueous ink detected by the coverage detecting unit exceeds a predetermined threshold value, the amount of the aqueous ink is reduced by the ink amount control unit.

By this configuration, it is possible to surely inhibit paper from being deformed due to the effects of water contained in the aqueous ink by reducing the amount of the aqueous ink in accordance with the print coverage.

In a preferred embodiment of the present invention, the ink amount control unit is provided with the functionality of adjusting the amount of the non-aqueous ink at the same time as reducing the amount of the aqueous ink.

By this configuration, trade off can be made between prevention of paper jam and the image quality and density by reducing the amount of the aqueous ink but compensating the density of the image with the non-aqueous ink. For example, it is possible to inhibit paper from being deformed and prevent paper jam by reducing the print coverage of the aqueous ink in order not to increase the print coverage of the aqueous ink beyond a predetermined value, and to inhibit change in the density and shade due to the increased amount of the non-aqueous ink and the reduced print coverage of the aqueous ink.

In a preferred embodiment of the present invention, the ink amount control unit controls the ink amount by selecting one of a plurality of color profiles in which the amount of the aqueous ink and the amount of the non-aqueous ink are stored in association with the print coverages of the colors corresponding thereto respectively, and referring to the selected one of the plurality of color profiles.

In this case, it is possible to reduce the arithmetic operation amount and processor load during the print process and speed up the print process by making use of color profiles relating to the ink amounts to be used of the aqueous ink and the non-aqueous inks as calculated in accordance with the print coverages.

In a preferred embodiment of the present invention, the printing apparatus further comprises: a jam detecting unit configured to detect a failure occurring of a transportation mechanism for transporting the print sheet to be printed, wherein the ink amount control unit changes the scheme of controlling the ink amounts in accordance with the failure designated by the jam detecting unit.

In this case, when paper jam is estimated as paper deformation due to the aqueous ink, it is possible to prevent paper jam by performing the process of reducing the print coverage of the aqueous ink automatically or manually by user's operation. Meanwhile, if the scheme of controlling the ink amounts is changed for the reason that the paper jam is detected in this manner, the color profile may be adjusted in accordance with the condition under which the paper jam occurred and the change in the ink amount.

In accordance with the present invention, the printing apparatus for forming images by overlappingly performing print processes for a plurality of colors is provided wherein, when printing with the non-aqueous and aqueous inks, it is possible to inhibit paper from being deformed due to the effects of water contained in the aqueous ink and to realize a high density print process with a low see-through density.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

In the following description, an embodiment of the present invention will be explained in conjunction with the accompanying drawings.

First Embodiment

Overall Configuration of Printing Apparatus

Figure 1:
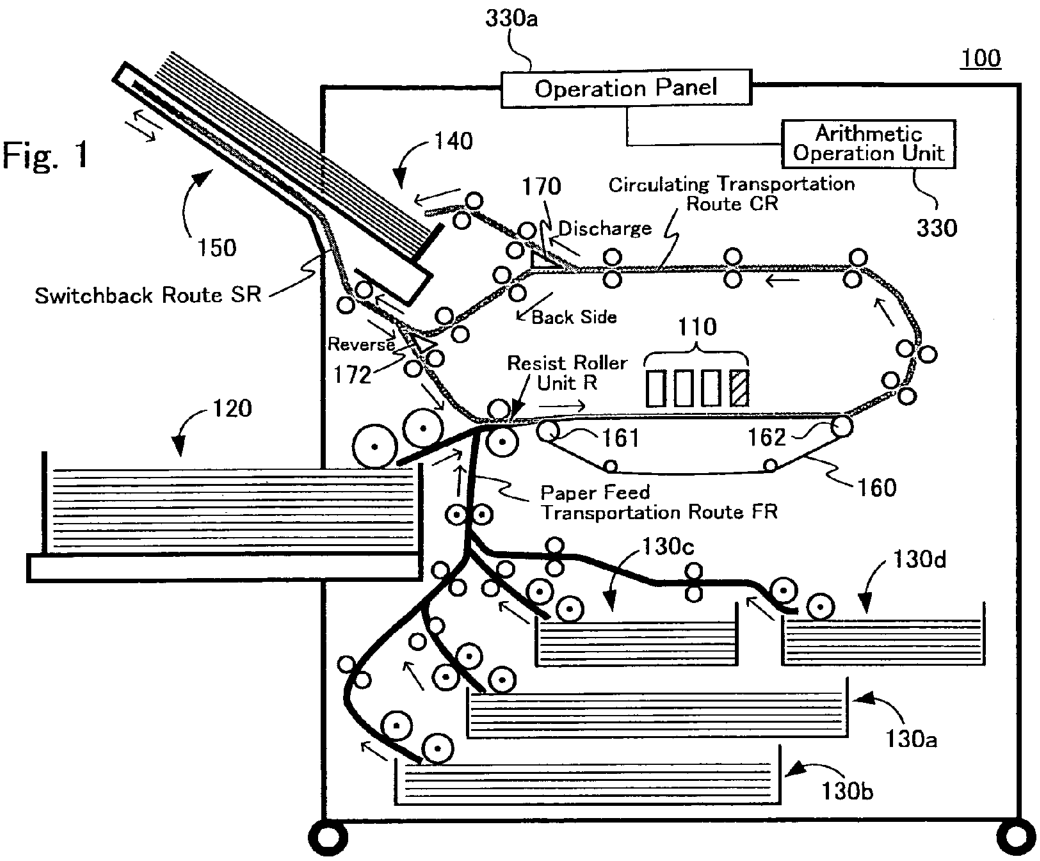
FIG. 1 is a schematic diagram for showing the transportation route for print sheet of the printing apparatus in accordance with a first embodiment of the present invention.

The first embodiment of the present invention will be explained with reference to the drawing. FIG. 1 is a schematic diagram for showing the transportation route for the print sheet of the printing apparatus 100 in accordance with the present embodiment.

First, the printing apparatus 100 shown in FIG. 1 is provided with a paper feed mechanism for feeding print sheets including a paper feed side tray 120 exposed from the side surface of the housing of the printing apparatus 100, a plurality of paper feed trays 130*a*, 130*b*, 130*c* and 130*d* which are located inside the housing. Furthermore, a discharge port 140 is provided as a discharge mechanism for discharging print sheets which have been printed.

In the case of the present embodiment, the printing apparatus 100 is a line color inkjet printer provided with a plurality of ink heads 110 each of which is elongated in the width direction of the print sheet. The respective ink heads 110 eject black or color inks respectively in order to print images of the respective colors on a line-by-line basis to overlap each other.

A print sheet fed from either the paper feed side tray 120 or one of the paper feed trays 130 is transported along a paper feed transportation route FR by rollers or another transportation mechanism to a resist roller unit R which defines a reference position at which the leading edge of each print sheet is aligned. The head units 110 having a plurality of print heads are located in the downstream side of the paper transportation route as seen from the resist roller unit R. The print sheet is printed to form an image with ink ejected from the respective print heads on a line-by-line basis, while being transported at a predetermined speed on a conveyor belt 160 which is located on the opposite side to the print heads 110.

The print sheet which has been printed is transported in the housing by the transportation mechanism such as rollers. In the case of the one-side printing process for printing only one side of the print sheet, the print sheet is transferred to the discharge port 140 and stacked on a catch tray 150 as a receiver at the discharge port 140 with the printed side down. The catch tray 150 is provided to protrude from the housing with a certain thickness. The catch tray 150 is slanted with a lower upright wall at which print sheets discharged from the discharge port 140 are automatically aligned under their own weight.

In the case of the double-side printing process for printing both sides of the print sheet, the print sheet is not transferred to the discharge port 140 after printing the main side (the first printed side is called "main side", and the next printed side is called "back side" in this description), but is transported in the housing. Because of this, the printing apparatus 100 is provided with a shunt mechanism 170 for selectively switching the transfer route for printing on the back side. After printing on the main side, the shunt mechanism 170 transfers the print sheet to a switchback route SR such that the print sheet is reversed with respect to the transportation route by the switchback operation. The print sheet is transferred to the resist roller unit R again by the transportation mechanism such as rollers through a switching mechanism 172, and printed on the back side in the same manner as on the main side. After printing on the back side, the print sheet with images printed on the both sides is transferred to the discharge port 140, and stacked on the catch tray 150 as the receiver at the discharge port 140.

Incidentally, in the case of the present embodiment, the switchback operation is performed by the use of the space formed inside the catch tray 150 in the double-side printing mode. The space formed in the catch tray 150 is provided such that the print sheet cannot be accessed externally during the switchback operation. By this configuration, it is avoided that a user extracts the print sheet during the switchback operation by mistake. On the other hand, since the catch tray 150 is indispensable for the printing apparatus 100, there is no need for a separate space, which is particularly provided in the printing apparatus 100 for the switchback operation, while making use of the space formed in the catch tray 150 for the switchback operation. Accordingly, it is possible to prevent the size of the housing from increasing for the purpose of implementing the switchback operation. Furthermore, since the discharge port and the switchback route are separated, the paper discharge operation can be performed in parallel with the switchback operation.

In the double-side printing mode of the printing apparatus 100, the print sheet is transferred to the resist roller unit R, which defines the reference position at which the leading edge of the print sheet is aligned, not only before printing one side thereof but also before printing the other side. Because of this, just before the resist roller unit R, there is a junction point between the transportation route for the print sheet just fed and the transportation route for the print sheet having one printed side.

Figure 2:
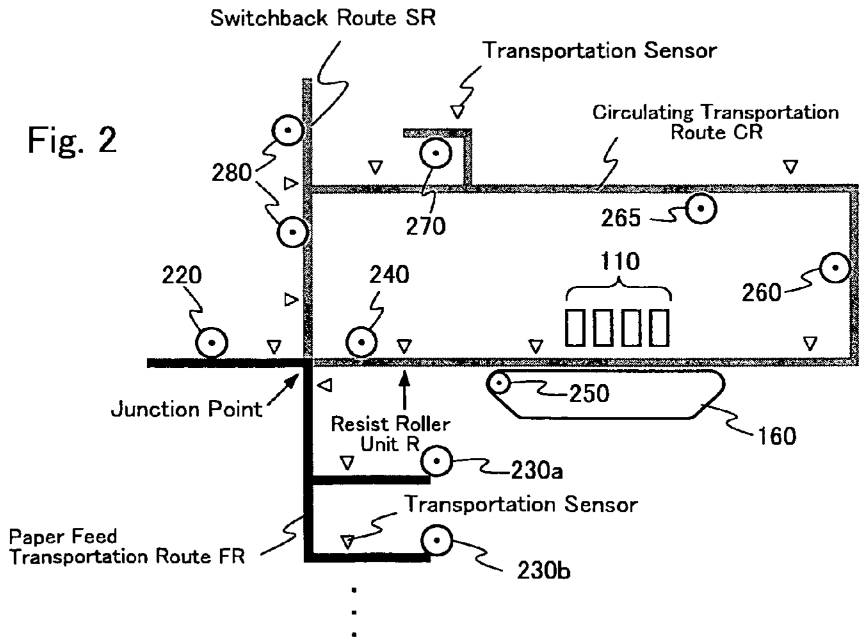
FIG. 2 is a diagram for schematically showing the paper feed transportation route FR and the circulating transportation route CR in accordance with the first embodiment.

The paper transportation route is divided into the paper feed transportation route FR, which is located on the paper feed mechanism side as seen from this junction point, and the remaining circulating transportation route CR. FIG. 2 is a diagram for schematically showing the paper feed transportation route FR and the circulating transportation route CR. Some of rollers forming the transportation mechanism are not illustrated for the sake of clarity in explanation.

The paper feed transportation route FR is provided with a side feed transportation unit 220 for feeding paper from the paper feed side tray 120, and a first tray feed transportation unit 230*a*, a second tray feed transportation unit 230*b*, . . . respectively for feeding paper from the paper feed trays 130*a*, 130*b*, 130*c* and 130*d*. Each transportation unit comprises a transportation mechanism constructed by a plurality of rollers to extract print sheets one after another from the paper feed tray corresponding thereto and transfer the print sheets to the resist roller unit R. The respective transportation units can be driven independently from each other, and perform necessary operation in order to implement the paper feed mechanism.

In addition, the paper feed transportation route FR is provided with a plurality of transportation sensors with which paper jam can be detected along the paper feed transportation route FR. Each transportation sensor is a sensor which can determine if a print sheet is present and detect the leading edge of the print sheet. For example, the plurality of transportation sensors are located in appropriate positions of the paper feed transportation route at appropriate intervals. Paper jam can be detected if the transportation sensor located on the transportation side does not detect the print sheet a predetermined time after the transportation sensor located on the paper feeding side detects the print sheet. Furthermore, paper jam (paper feeding error) can also be detected if the transportation sensor located near the paper feed tray does not detect the print sheet a predetermined time after starting driving the side feed transportation unit 220, the first tray feed transportation unit 230*a* or the like.

By providing the transportation sensor near each paper feed tray, it is possible to determine whether or not paper jam occurs in the paper feed transportation route FR, and determine in what location of the paper feed transportation route FR the paper jam occurs.

Along the circulating transportation route CR, there are a resist drive unit 240 for receiving a print sheet at the resist roller unit R, a belt drive unit 250 for driving the conveyor belt 160, which is located in a position opposite the head units 110, in an endless motion, first and second upper side paper transportation units 260 and 265 which are arranged on the circulating transportation route CR successively in the paper transportation direction, an upper side paper discharge transportation unit 270 for transferring a printed sheet to the discharge port 140, and a switchback route transportation unit 280 for drawing the printed sheet in the switchback route SR, reversing and transferring the printed sheet to the junction point between the circulating transportation route CR and the paper feed transportation route. Each of these transportation units is provided with a driving mechanism comprising one or more rollers, and serves to transport print sheets one after another along the transportation route. The respective transportation units can be driven independently from each other, and perform necessary operation in accordance with the transportation position of the print sheet.

The circulating transportation route CR is also provided with a plurality of transportation sensors with which paper jam can be detected along the circulating transportation route CR. Furthermore, it can be confirmed that each print sheet is transferred to the resist roller unit R in an appropriate manner. A transportation sensor is provided near each transportation unit, and thereby it is possible to determine in what location of the circulating transportation route CR the paper jam occurs.

Meanwhile, in the case of the present embodiment, a print sheet is fed to the printing apparatus 100 in advance of discharging the preceding print sheet, without waiting until the preceding print sheet is discharged, so that print sheets are successively fed and continuously printed.

The conveyor belt 160 is located between and running around driving and driven rollers 161, 162 located in a position opposite the head units 110, and rotates about them in the clockwise direction as seen in the figure. Four ink heads 110 of yellow (Y), magenta (M), cyan (C), and black (K) are arranged over the upper surface of the conveyor belt 160 along the moving direction thereof, and located opposite the conveyor belt 160 to form a color image by superimposing four monochromatic images on the print sheet.

Particularly, in the case of the present embodiment, there are arranged, as head units 110, an aqueous ink head unit and non-aqueous ink head units in order to perform hybrid print process in which at least one of a plurality of colors is printed by the use of a non-aqueous ink containing a water-insoluble solvent, and the remaining colors are printed by the use of aqueous inks containing a water-soluble solvent.

Specifically speaking, the ink heads of C, M and Y discharge C, M and Y non-aqueous inks, and the ink head of K discharges an aqueous ink. And, the the ink heads of C, M and Y are arranged in the upstream side of the ink head of K in the transfer direction of the print sheet such that the print processes using the non-aqueous inks are performed in advance of the print process using the aqueous ink.

Incidentally, in the case of the present embodiment, the water-insoluble solvent can be selected from among aromatic hydrocarbon solvents, aliphatic hydrocarbon solvents, and alicyclic hydrocarbon solvents, ester solvents, alcohol solvents, higher fatty acid solvents, ether solvents and a mixture of these solvents. More specifically described, these solvents include Teclen N-16, Teclen N-20, Teclen N-22, Nisseki Naphthesol L, Nisseki Naphthesol M, Nisseki Naphthesol H, #0 Solvent L, #0 Solvent M, #0 Solvent H. Nisseki Isosol 300, Nisseki Isosol 400, AF-4, AF-5, AF-6 and AF-7 which are available from NIPPON OIL CORPORATION, Isopar G, Isopar H, Isopar L, Isopar M, Exxo1D40, Exxo1D80, Exxo1D100, Exxo1D130 and Exxo1D140 which are available from Exxon, methyl laurate, isopropyl laurate, isopropylmyristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, di-isopropyl adipate, di-isopropyl sebacate, diethyl sebacate, propylene glycol monocaprate, trimethylolpropane tri-2-ethylhexanoate and glyceryl tri-2-ethylhexanoate and other ester solvents. Also, these solvents include alcohol solvents such as isomyristyl alcohol, isopalmityl alcohol, isostearyl alcohol and oleyl alcohol. Furthermore, these solvents include fatty acid solvents such as isononanoic acid, isomyristic acid, hexadecanoic acid, isopalmitic acid, oleic acid and isostearic acid. Still further, these solvents include ether solvents such as diethylene glycol monobutyl ether, ethylene glycol monobutyl ether, propylene glycol monobutyl ether, and propylene glycol dibutyl ether.

On the other hand, the water-insoluble solvent of the present embodiment can be selected from among alcohol solvents, amine solvents, glycol ether solvents, amid solvents, sulfoxide solvents, heterocyclic solvents, sulfonate solvents and a mixture of these solvents. More specifically described, these solvents include glycol ethers such as ethylene glycol monomethyl ether, ethylene glycol monobutyl ether, ethylene glycol monoisopropyl ether, diethylene glycol monomethyl ether, diethylene glycol monobutyl ether, diethylene glycol dimethyl ether, triethylene glycol monomethyl ether, triethylene glycol monobutyl ether, propylene glycol monobutyl ether, propylene glycol monomethyl ether, dipropylene glycol monomethyl ether, and tripropylene glycol monomethyl ether. Also, these solvents include alcohol solvents such as methanol, ethanol, propanol, isopropanol, butanol, isobutanol, secondary butanol, tertiary butanol, pentanol, hexanol, cyclohexanol, benzyle alcohol, ethylene glycol, diethylene glycol, triethylene glycol, polyethylene glycol, propylene glycol, dipropylene glycol, polypropylene glycol, butylene glycol, hexanediol, pentanediol, glycerine, hexanetriol, thiodiglycol, 1,3-propanediol, 1,4-butanediol, 1,5-pentanediol, 1,2-pentanediol, 1,2-hexanediol, and 1,2,6-hexanetriol. Furthermore, these solvents include amine solvents such as ethanolamine, diethanolamine, triethanolamine, N-methyl diethanolamine, N-ethyl diethanolamine, morpholine, N-ethyl morpholine, ethylenediamine, diethylenediamine, triethylenetetramine, tetraethylenepentamine, polyethyleneimine, pentamethyl diethylene triamine, tetramethyl propylene diamine. Still further, these solvents include amide solvents such as formamide, N,N-dimethylformamide, N,N-dimethylacetamide. Still further, these solvents include heterocyclic solvents such as 2-pyrrolidone, N-methyl-2-pyrrolidone, cyclohexylpyrrolidone, 2-oxazolidone. Still further, these solvents include sulfoxide solvents such as dimethyl sulfoxid. Still further, these solvents include sulfones solvents such as sulfolane.

Meanwhile, as shown in FIG. 1, the printing apparatus 100 is provided with an arithmetic operation unit 330. This arithmetic operation unit 330 is an arithmetic operation module composed of hardware elements, for example, processor(s) such as a CPU and a DSP (Digital Signal Processor), a memory, and other necessary electronic circuits, and software (and/or firmware) for implementing necessary functions in combination with the hardware. Several function modules can be implemented by the software for performing the processes of handling image data, controlling the operations of the respective units, and performing a variety of processes in response to the manipulation by the user. In addition, this arithmetic operation unit 330 is connected to an operation panel 330*a*, through which the arithmetic operation unit 330 can receive commands and settings from the user.

(Hybrid Print Process)

The hybrid print process in accordance with the present invention is performed by the arithmetic operation unit 330 which analyzes image data and controls the operations of the head units 110, the respective drive motors, and drive units such as switching devices for driving the transfer mechanism.

Figure 3:
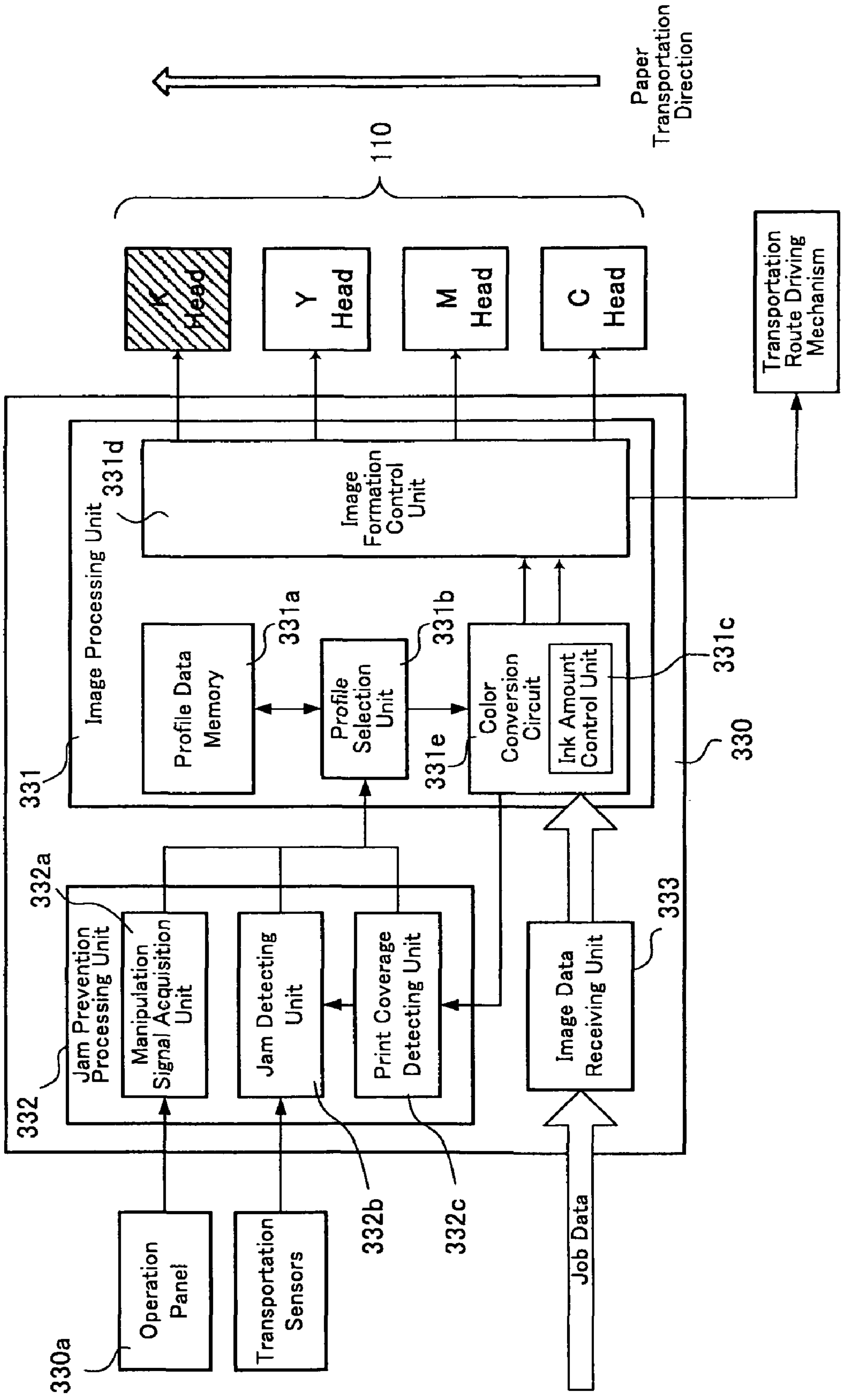
FIG. 3 is a block diagram for showing a function module implemented within the arithmetic operation unit for performing the hybrid print process in accordance with the first embodiment.

FIG. 3 is a block diagram for showing a function module implemented within the arithmetic operation unit 330 for performing the hybrid print process. As shown in FIG. 3, the arithmetic operation unit 330 is provided mainly with a jam prevention processing unit 332, an image data receiving unit 333 and an image processing unit 331.

The image data receiving unit 333 is a communication interface for receiving job data, and serves as a module for transferring image data contained in the received job data to the image processing unit 331 and the jam prevention processing unit 332.

The image processing unit 331 is an arithmetic processing unit for performing digital signal processes specialized for processing images, and serves as a module for performing image conversion and other necessary processes and performing print processes. This image processing unit 331 is provided with a profile data memory 331*a*, a profile selection unit 331*b*, an ink amount control unit 331*c*, an image formation control unit 331*d*, and a color conversion circuit 331*e*.

The profile data memory 331*a* is a storage device for storing a plurality of color profiles, from which the profile selection unit 331*b* reads a data file and transfers the data file to the ink amount control unit 331*c* through the profile selection unit 331*b*.

The color profile is table data in which the print coverages of the respective colors are associated with the amounts of aqueous ink and non-aqueous ink which are determined in accordance with the print coverage. In the case of the present embodiment, a plurality of color profiles are prepared for a plurality of print coverages. The ink amount control unit 331*c* controls the ink amounts of the respective colors by selecting one of the plurality of color profiles and adjusting the ink amounts in accordance with the color profile which is selected. Table 1 shows color profiles which are used in accordance with the present embodiment.

TABLE 1

| | Profile 1 | Profile 2 | Profile 3 | Profile 4 |
|---|---|---|---|---|
| Print Coverage | 20% | 50% | 70% | 130% |
| CMY Total Rate | 30% | 50% | 60% | 80% |
| K Rate | 100% | 80% | 70% | 50% |

The profile selection unit 331*b* is a module for selecting and reading an appropriate one of the plurality of color profiles stored in the profile data memory 331*a* on the basis of occurrence of jamming and the print coverage detected by the coverage detecting unit 332*c*, and transmits the selected color profile to the ink amount control unit 331*c*. The profile selection unit 331*b* performs the selection of the color profile with reference to the print coverages and distribution of the respective color inks detected by the coverage detecting unit 332*c* and so forth on the basis of whether or not the print coverages of the respective color inks exceed a predetermined threshold value in order to determine an appropriate amount of each ink. Also, in the case of the present embodiment, the profile selection unit 331*b* performs the selection of the color profile by referring not only to the print coverage but also the detection or estimation of jamming by a jam detecting unit 332*b* and user's operation received by a manipulation signal acquisition unit 232*a*.

By this configuration, in the case of the present embodiment, when the paper jam is estimated as paper deformation due to an aqueous ink, the process of reducing the print coverage of the aqueous ink is performed automatically by the jam detecting unit 332*b* or manually by user's operation which is received by the manipulation signal acquisition unit 332*a* to avoid paper jam. Meanwhile, if the scheme of controlling the ink amounts is changed for the reason that the paper jam is detected, the color profile may be adjusted in accordance with the condition under which the paper jam occurred and the change in the ink amount.

The color conversion circuit 331*e* is a circuit for converting an RGB print image into a CMYK print image by the use of a color profile, and the image formation control unit 331*d* performs a print process on the basis of the print image for the respective colors. When this conversion is performed, the color conversion circuit 331*e* performs interim color conversion with reference to the default color profile 1, and transmits to the coverage detecting unit 332*c* the print image of the converted print images corresponding to the color to be printed with the aqueous ink. In this example, since the aqueous ink is used to print black as the particular color, the K print image is transmitted to the coverage detecting unit 332*c*.

Also, the color conversion circuit 331*e* is provided with the ink amount control unit 331*c*. When the profile selection unit 331*b* changes the color profile in accordance with the print coverages and distribution of the respective color inks detected by the coverage detecting unit 332*c*, the color conversion circuit 331*e* adjusts the ink amounts on the basis of the color profile as changed.

The ink amount control unit 331*c* is a module for controlling the ink amounts of the respective colors on the basis of the color profile selected by the profile selection unit 331*b*. The image formation control unit 331*d* receives a control signal transmitted from the ink amount control unit 331*c*, and adjusts the ink amounts to be discharged from the ink heads of the respective colors.

In the case of the present embodiment, the ink amount control unit 331*c* is provided with the functionality of reducing the amount of the aqueous ink and at the same time adjusting the amount of the non-aqueous ink. For example, the ink amount control unit 331*c* decreases the print coverage of the aqueous ink in order not to exceed a predetermined value and at the same time increases the amount of the non-aqueous ink in order to inhibit the change in the density and color quality due to the decreased print coverage of the aqueous ink. Also, as has been discussed above, when the color profile is changed in response to the fault detected by the jam detecting unit 332*b* or in response to the user operation, the ink amount control unit 331*c* of the present embodiment changes the control scheme in regard to the ink amount on the basis of the color profile which is changed.

The image formation control unit 331*d* is a module for controlling the overall image forming process by controlling the operations of the ink heads of the respective colors and the driving means along the transportation route. For example, when the print coverage of the aqueous ink detected by the coverage detecting unit 332*c* exceeds a predetermined threshold value, the color profile is changed to reduce the amount of the aqueous ink by the control signal transmitted from the ink amount control unit 331*c* in accordance with the selected color profile.

On the other hand, the above jam detecting unit 332 is provided with the manipulation signal acquisition unit 332*a*, the jam detecting unit 332*b* and the coverage detecting unit 332*c*.

The manipulation signal acquisition unit 332*a* is a module for receiving the manipulation signal from the user through the operation panel 330*a*, interprets the received manipulation signal, and performs the processes indicated by the manipulation signal with other modules.

Figure 4:
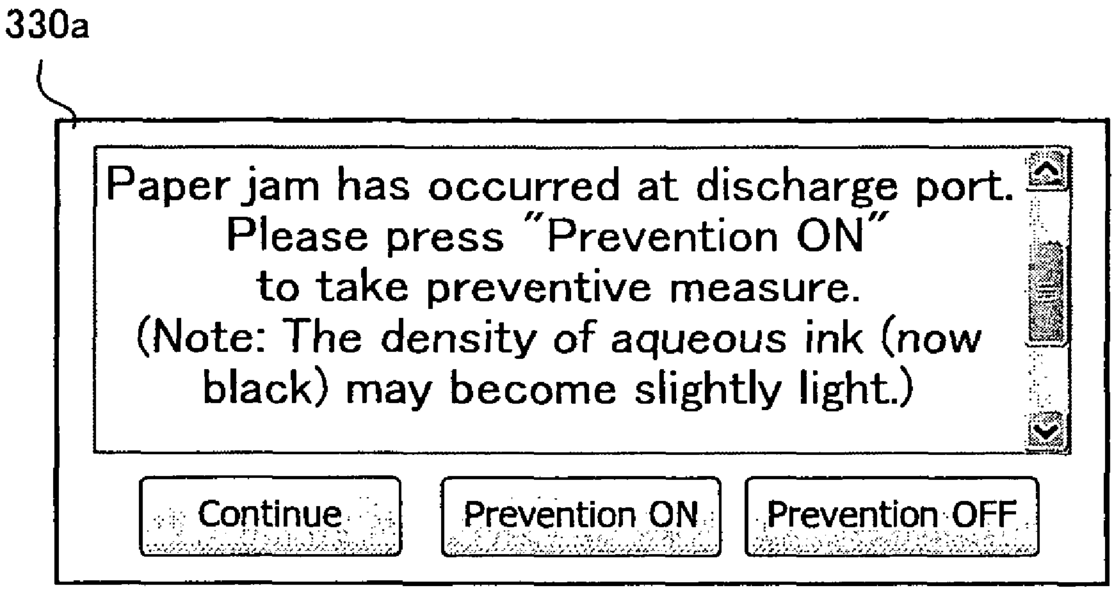
FIG. 4 shows a panel image in accordance with the first embodiment.

Particularly, in the image forming process of the present embodiment, the manipulation signal acquisition unit 332*a* serves to receive instruction manipulation or setting manipulation through the operation panel 330*a* displaying a control image shown in FIG. 4 as to whether or not to restrict the aqueous ink amount to be discharged for preventing paper jam from occurring and informs the profile selection unit 331*b* of whether or not to perform the process of preventing paper jam from occurring.

The coverage detecting unit 332*c* is a module for detecting the print coverages and distributions of the respective colors in correspondence with the image data contained in the job data processed by a DSP 330, and outputs the detection result to the jam detecting unit 332*b* and the profile selection unit 331*b*. Meanwhile, the print coverage may be calculated on the basis of the information on the area having the highest print coverage or the area under worst condition among a plurality of areas into which the image is divided.

The jam detecting unit 332*b* is a module for detecting or estimating a failure such as a paper jam occurred in the transportation mechanism for transporting the print sheet to be printed, and the result detected by the jam detecting unit 332*b* is input to the profile selection unit 331*b*. In this jam detecting process, the jam detecting unit 332*b* performs failure detection or estimation on the basis of paper jam or transportation delay detected by transportation sensors which are provided in various locations of the transportation route, acquires the information on the print coverage from the coverage detecting unit 332*c*, estimates whether or not the paper jam which is occurring is caused by an inappropriate print coverage of the aqueous ink, and outputs the estimated result to the profile selection unit 331*b*.

(Hybrid Print Process)

Figure 5:
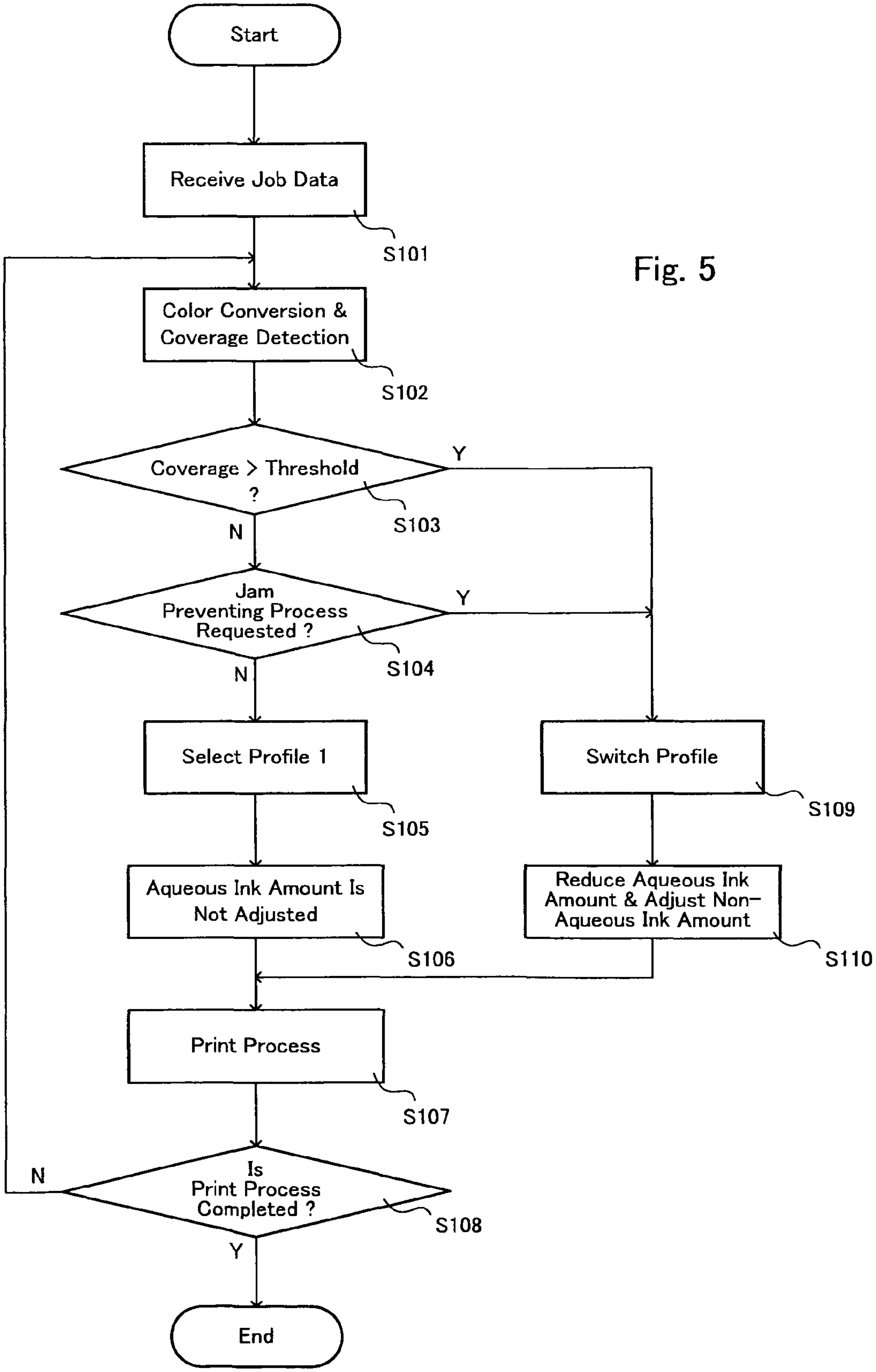
FIG. 5 is a flow chart for showing the operation of the printing apparatus in accordance with the first embodiment when performing the hybrid print process.

The hybrid print process can be performed by operating the printing apparatus having the structure as described above as follows. FIG. 5 is a flow chart for showing the operation of the printing apparatus in accordance with the present embodiment when performing the hybrid print process.

First, when job data is received, image data is acquired in step S101. The image data is color converted into a print image by the color conversion circuit 331*e* followed by performing detection of the print coverages on the basis of the print image as converted in step S102. More specifically speaking, the color conversion circuit 331*e* converts the RGB print image into a CMYK print image on the basis of the profile 1. The print image (K image in this case) to be printed with the aqueous ink is transmitted to the coverage detecting unit 332*c* which then detects the print coverage thereof.

If the print coverage does not exceed a predetermined threshold value (i.e., the "No" branch from step S103), it is determined in step S104 whether or not the process of preventing paper jam from occurring is requested. This determination is made in accordance with whether or not paper jam is detected during the previous print process, or whether or not the jam preventing process is preferentially selected by the user operation.

When it is determined in step S104 that the jam preventing process is not requested, the profile 1 is continuously used to perform the print process in step S107 without adjusting the discharge amount of the particular color ink (aqueous black ink in this example) in step S106.

On the other hand, when the print coverage exceeds the predetermined threshold value (i.e., the "Yes" branch from step S103), or when it is determined in step S104 that the jam preventing process is not requested, the profile selection unit 331*b* switches the color profile to the profile 2 in step S109. And, if necessary, the conversion process is performed again, or the ink amount control unit 331*c* reduces the amount of the aqueous ink in step S110. In this case, while reducing the amount of the aqueous ink, the ink amount control unit 331*c* increases the amount of the non-aqueous ink for the purpose of preventing the color density from lowering due to the reduction of the amount of the aqueous ink.

Thereafter, the print job are completely performed in steps S107 and S108, followed by finishing the process.

In accordance with the present embodiment as described above, it is possible to inhibit paper from being deformed and at the same time to improve the quality of printed images by performing the print process with the non-aqueous inks in advance of the print process with the aqueous ink. Particularly, since black (K) is printed with an aqueous ink in the case of the present embodiment, it is possible to increase the density of a solid black area and reduce the black density as seen through from the back side. Also, by making use of non-aqueous inks for printing CMY, it is possible to inhibit paper from being deformed due to the effects of water contained in the aqueous ink even if the print coverage is high (in a solid black area, or areas filled in with a second color prepared by combining red, blue and/or green).

Table 2 shows the subjectively-based qualities (contrast and shade) of printed images when black was printed only with the aqueous ink, when black was printed by the hybrid print process in accordance with the profile 1 and the profile 2, and when black was printed only with the non-aqueous inks respectively.

TABLE 2

| Image Quality (Subjectively-based Evaluation) | | | | |
|---|---|---|---|---|
| | Aqueous | Profile 1 | Profile 2 | Non-Aqueous |
| Contrast | ◎ | ○ | Δ~○ | Δ |
| Color Shade | ◎ | Δ | Δ | Δ |

As shown in Table 2, when black was printed by the hybrid print process in accordance with the profile 1 and the profile 2, the image quality was better than when black was printed only with the non-aqueous inks.

Also, Table 3 shows the density of composite solid black areas (OD value).

TABLE 3

| Solid Black Density (OD Value) | | | | |
|---|---|---|---|---|
| | Aqueous Alone | Profile 1 | Profile 2 | Non-Aqueous Alone |
| Main Side | 1.52 | 1.31 | 1.13 | 1.07 |
| Back Side | 0.23 | 0.30 | 0.33 | 0.33 |

As shown in Table 3, when black was printed by the hybrid print process in accordance with the profile 1 and the profile 2, the density of solid black was higher than when black was printed only with the non-aqueous inks such that the better image quality was achieved.

Also, Table 4 shows the measurements of paper deformation with varying rates of the aqueous ink and non-aqueous ink in comparison with the measurements of paper deformation when the aqueous ink or the non-aqueous ink is used alone. Incidentally, in this case, the total print coverage of CMYK is set to 130% at a maximum, and black (K) is printed with an aqueous ink when the print process is performed in accordance with any color profile.

TABLE 4

| Measurements of Paper Deformation after Printing (mm) | | | | | | | |
|---|---|---|---|---|---|---|---|
| | Print Coverage | Aqueous Alone | Profile 1 | Profile 2 | Profile 3 | Profile 4 | Non-Aqueous Alone |
| CMY Total Rate | | 30% | 30% | 50% | 60% | 80% | 30% |
| K Rate | | 100% | 100% | 80% | 70% | 50% | 100% |
| Text Data | 20% | Small | Very Small | Very Small | Very Small | Very Small | 0 mm |
| Facsimile Image | 50% | Medium | Small | Very Small | Very Small | Very Small | 0 mm |
| Color Image | 70% | Medium | Small | Small | Very Small | Very Small | 0 mm |

TABLE 4-continued

| Measurements of Paper Deformation after Printing (mm) | | | | | | | |
|---|---|---|---|---|---|---|---|
| | Print Coverage | Aqueous Alone | Profile 1 | Profile 2 | Profile 3 | Profile 4 | Non-Aqueous Alone |
| SolidBlack | 130% | Large (50 mm) | Medium (30 mm) | — | Medium (28 mm) | Small (11 mm) | 0 mm |

For the reason that the degree of paper deformation becomes smaller as the proportion of the aqueous ink becomes lower, as shown in Table 4, it will be understood that there is an advantage in the hybrid print process in which the amount of the aqueous ink is adjusted by the use of the color profile in accordance with the present embodiment, as compared with the print process only with the aqueous inks.

(Modification Example)

Incidentally, while the aqueous ink is a black ink in the above embodiment, the present invention is not limited thereto. For example, of the plurality of colors, an aqueous ink can be used for represent a color having the highest density, or a color which can be used to prepare a second color in combination with another color.

For instance, K and either one of C, M, and Y may be printed with an aqueous ink. Namely, since the print coverage increases when printing a second color such as B=CM, R=MY or G=MC, it is possible to limit the print coverage of the aqueous ink and prevent the amount of water contained in the aqueous ink from increasing by not making use of aqueous inks for two or more colors of C, M, and Y.

Table 5 shows examples of the combinations and printing orders of the aqueous and non-aqueous inks.

TABLE 5

| Ink Combination | | | | |
|---|---|---|---|---|
| | Head 1 | Head 2 | Head 3 | Head 4 |
| Case 1 | C: Non-Aqueous | M: Non-Aqueous | Y: Non-Aqueous | K: Aqueous |
| Case 2 | C: Non-Aqueous | K: Aqueous | MY: Non-Aqueous | |
| Case 3 | C: Non-Aqueous | K: Aqueous | MY: Either is Aqueous | |

Meanwhile, as shown in Table 5, even if either one of C, M, and Y is aqueous in the case 3, the maximum amount of the aqueous ink is 110% in the case of composite K and 100% in the case of a second color such as red or blue containing M, and thereby the present invention can provide advantages in these cases. Alternatively, in the case where K and M are aqueous, the sum of the print coverages of K and M can be used in the coverage detecting unit.

Incidentally, in the case where K and M are aqueous, the coverage detecting unit detects the print coverage by adding the print coverages of K and M together.

Also, while the plurality of color profiles are used for adjusting the ink amounts in the above present embodiment, the present invention is not limited thereto. For example, in the case where the manufacture cost (reduction in circuit size) is given preference over the image quality, it is possible to calculate adjustment of ink amounts by simplified arithmetic operations such as multiplication of a default ink amount and a reduction coefficient, rather than by reading a color profile.

More specifically described, the black rate K described in the profile 1 is adjusted by simplified arithmetic operation such as multiplication with a coefficient "a" to obtain an adjusted black rate K' as follows.

$$K' = a \times K$$

where for example, a=0.8

Also, in this case, the print coverages of the other colors, i.e., Y, M and C are adjusted from [C, M, Y] to [C', M', Y'] by the following equation.

$$[C', M', Y'] = (1-a)/3 \times [C, M, Y]$$

Second Embodiment

Configuration of Printing Apparatus

Figure 6:
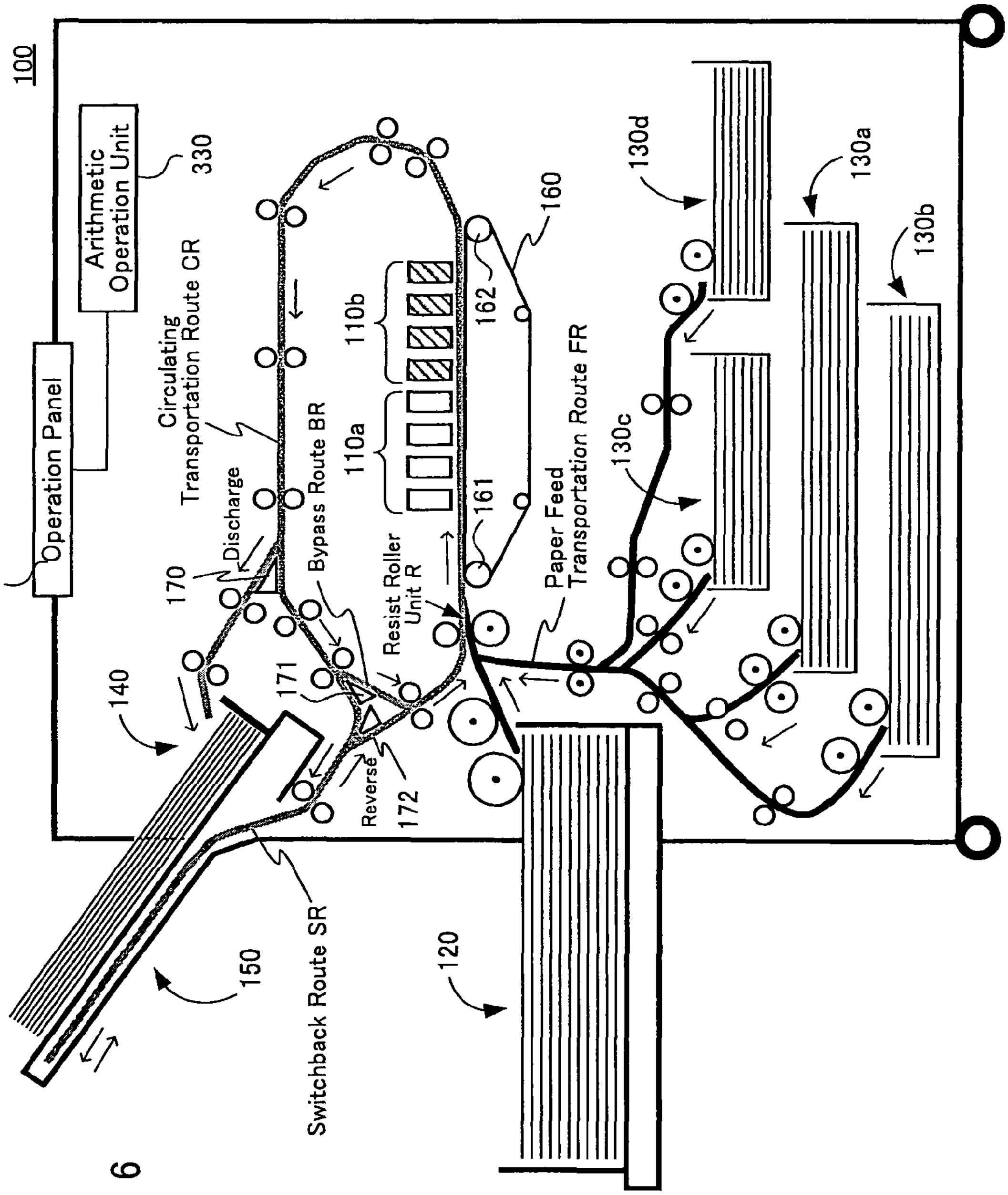
FIG. 6 is a schematic diagram for showing the transportation route for the print sheet of the printing apparatus in accordance with a second embodiment of the present invention.

Next, the second embodiment of the present invention of will be explained. FIG. 6 is a schematic diagram for showing the transportation route for the print sheet of the printing apparatus 100 in accordance with the present embodiment. Meanwhile, in the description of the present embodiment, like reference numbers indicate functionally similar elements as the above first embodiment unless otherwise specified, and therefore no redundant description is repeated.

In the case of the present embodiment, while the transportation mechanism is designed and controlled in order to transfer the print sheet twice along the circulating transportation route CR without reversing the print sheet, there are provided an ink head unit 110*a* for discharging a non-aqueous ink for each color and an ink head unit 110*b* for discharging an aqueous ink for each color. It is determined for each color which the non-aqueous ink or the aqueous ink is to be used depending upon the image of the printed material in accordance with the job.

More specifically described, as shown in FIG. 6, the printing apparatus in accordance with the present embodiment is provided with a bypass route BR and a switching mechanism 171 in addition to the configuration of the first embodiment as described above. The print sheet is selectively transferred from the circulating transportation route CR to the switchback route SR or the bypass route BR through the switching mechanism 171. Then, on the bypass route BR side, the print sheet is transferred to the circulating transportation route CR as it is without reversing. Because of this, in the present embodiment, the print sheet can be circulated again with the same print side through the bypass route BR such that this same print side can be passed through the ink head units 110*a* and 110*b* successively for a plural number of times.

Figure 7:
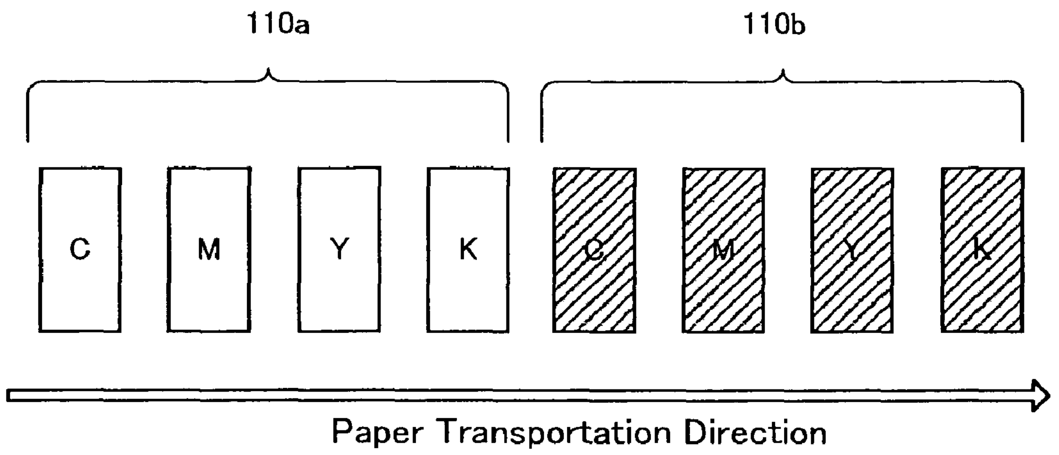
FIG. 7 is a schematic diagram for showing ink head units in accordance with the second embodiment.

Also, as illustrated in FIG. 7, the ink head unit 110*a* for discharging the non-aqueous inks and the ink head unit 110*b* for discharging the aqueous inks are arranged along the moving direction of the transfer belt 160 above the upper surface of the transfer belt 160. Each of the ink head units 110*a* and 110*b* includes four ink heads of yellow (Y), magenta (M), cyan (C) and black (K).

In the case of the present embodiment, the image formation control unit 331*d* controls the discharge timing of the aqueous inks and non-aqueous inks in synchronization with the circulation transportation of the print sheet by the transportation route driving mechanism in order that the non-aqueous print process is performed first and the aqueous print process is performed next by separately performing the print process with the non-aqueous inks and the print process with the aqueous inks.

For example, color profiles are prepared respectively for print schemes, i.e., the combinations and printing orders of the aqueous and non-aqueous inks such as in cases 1 to 3 shown in Table 5. The color profile describe the rates of the aqueous and non-aqueous inks in correspondence with the print coverages of the print scheme. The coverage detecting unit 332*c* detects the print coverage of each color. When there is a color of which the print coverage exceeds a threshold value, the profile selection unit 331*b* selects an appropriate print scheme in accordance with the combination of this color and the print coverage, reads the color profile corresponding to this print scheme, and outputs this color profile to the color conversion circuit 331*e*.

(Operation and Advantages of the Printing Apparatus)

Figure 8:
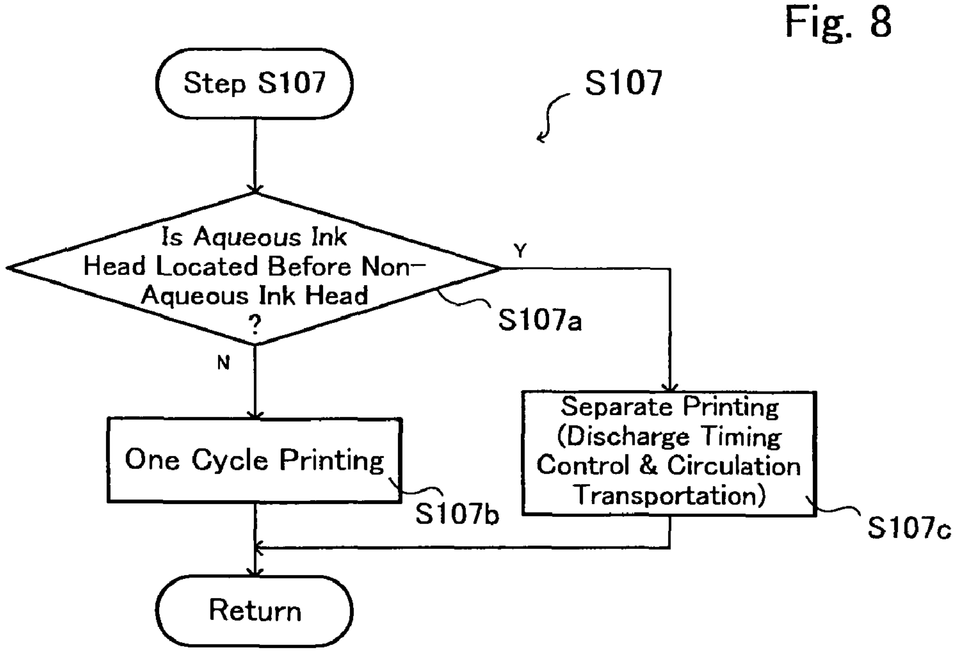
FIG. 8 is a flow chart for showing the operation of the hybrid print process in accordance with the second embodiment.

The hybrid print process can be performed by operating the printing apparatus having the structure as described above. Incidentally, in addition to the procedure of the first embodiment shown in FIG. 4, the process as shown in FIG. 8 is performed in step S107 in the case of the present embodiment. FIG. 8 is a flow chart for showing a subroutine which is used during the print process of the present embodiment.

As shown in FIG. 8, when the print process of the present embodiment is performed, it is determined whether or not the aqueous ink head to be used for the current print process is located on the upstream side of the non-aqueous ink to be used along the paper transportation route on the basis of the print scheme and color profile as currently selected in step S107*a*. If the aqueous ink head to be used is located on the downstream side of the non-aqueous ink to be used (i.e., the "No" branch from step S107*a*), the print process can be completed by one circulation in the same manner as in the first embodiment as described above. In this case, since the aqueous ink head to be used is located on the downstream side of the non-aqueous ink to be used, the non-aqueous ink is printed in advance of the aqueous ink.

Conversely, it is determined in step S107*a* that the aqueous ink head to be used is located on the upstream side of the non-aqueous ink to be used (i.e., the "Yes" branch from step S107*a*), the separate print process is performed by the use of the bypass route BR. More specifically described, the image formation control unit 331*d* controls the discharge timing of the aqueous inks and non-aqueous inks in synchronization with the circulation transportation of the print sheet by the transportation route driving mechanism in order that the non-aqueous print process is performed first and the aqueous print process is performed next by separately performing the print process with the non-aqueous inks and the print process with the aqueous inks.

In accordance with the present embodiment, it is possible to inhibit paper from being deformed and at the same time to improve the quality of printed images by performing the print process with the non-aqueous inks in advance of the print process with the aqueous ink in the same manner as in the above first embodiment. Particularly, in the case of the present embodiment, the aqueous ink and the non-aqueous ink can be printed in a separate manner by adjusting the discharge timings thereof in synchronization with the circulation transportation of the print sheet, and thereby any desired color can be printed dynamically with the aqueous ink irrespective of the arrangement of the ink heads of the respective colors. Because of this, it is possible to more effectively inhibit paper from being deformed and at the same time to improve the quality of printed images by making use of the aqueous ink for printing an arbitrary color and then performing the print process with the non-aqueous inks in advance of the print process with the aqueous ink.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A printing apparatus for forming images by overlappingly performing print processes for a plurality of colors, comprising:

a plurality of ink heads supplied with inks of a plurality of colors, with each ink head elongated in a width direction of the print sheet, and at least one of said inks provided as a non-aqueous ink containing a water-insoluble solvent, and the remaining inks provided as aqueous ink containing a water-soluble solvent; and an image formation control unit configured to control a discharge timing of each of the inks to print the non-aqueous ink in advance of printing the aqueous ink on a single surface of the print sheet.

2. The printing apparatus as claimed in claim 1 wherein, of the plurality of colors, the color having the highest density is printed with the aqueous ink.

3. The printing apparatus as claimed in claim 1 wherein, of the plurality of colors, black is printed with the aqueous ink.

4. The printing apparatus as claimed in claim 1 wherein, of the plurality of colors, a color which can be used to prepare a second color in combination with another color is printed with the aqueous ink.

5. The printing apparatus as claimed in claim 1 further comprising:

a circulation transportation unit configured to transport a print sheet to be printed in order that the print sheet is circulated and passed through an image forming unit, which discharges inks of the plurality of colors, for a plural number of times, wherein the image formation control unit controls the discharge timing of each of the aqueous and non-aqueous inks in synchronization with the circulation transportation of the print sheet in order that the print process of the non-aqueous ink is performed in advance of the print process of the aqueous ink.

6. The printing apparatus as claimed in claim 1 further comprising:

a coverage detecting unit configured to detect the print coverage of each of the plurality of colors; and an ink amount control unit configured to control the ink amount of each of the plurality of colors, wherein, when the print coverage of the aqueous ink detected by the coverage detecting unit exceeds a predetermined threshold value, the amount of the aqueous ink is reduced by the ink amount control unit.

7. The printing apparatus as claimed in claim 1 wherein the ink amount control unit is provided with the functionality of adjusting the amount of the non-aqueous ink at the same time as reducing the amount of the aqueous ink.

8. The printing apparatus as claimed in claim 1 wherein the ink amount control unit controls the ink amount by selecting one of a plurality of color profiles in which the amount of the aqueous ink and the amount of the non-aqueous ink are stored in association with the print coverages of the colors corresponding thereto respectively, and referring to the selected one of the plurality of color profiles.

9. The printing apparatus as claimed in claim 1 further comprising:

a jam detecting unit configured to detect a failure occurring of a transportation mechanism for transporting the print sheet to be printed, wherein the ink amount control unit changes the scheme of controlling the ink amounts in accordance with the failure designated by the jam detecting unit.

10. The printing apparatus as claimed in claim 1 wherein an ink head supplied with the non-aqueous ink is arranged on an upstream side of a remaining ink head supplied with aqueous ink in a transfer direction of the print sheet.

* * * * *